(12) United States Patent
Nitta (10) Patent No.: US 12,265,873 B2
(45) Date of Patent: Apr. 1, 2025

(54) RFID LABEL AND ADHEREND

(71) Applicant: SATO HOLDINGS KABUSHIKI KAISHA, Tokyo (JP)

(72) Inventor: Haruhiko Nitta, Minato-ku (JP)

(73) Assignee: SATO HOLDINGS KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/269,530

(22) PCT Filed: Nov. 30, 2021

(86) PCT No.: PCT/JP2021/043962
§ 371 (c)(1),
(2) Date: Jun. 23, 2023

(87) PCT Pub. No.: WO2022/138019
PCT Pub. Date: Jun. 30, 2022

(65) Prior Publication Data
US 2024/0070430 A1    Feb. 29, 2024

(30) Foreign Application Priority Data

Dec. 24, 2020   (JP) .................. 2020-215297

(51) Int. Cl.
*G06K 19/07*      (2006.01)
*G06K 19/077*     (2006.01)

(52) U.S. Cl.
CPC ..... *G06K 19/0776* (2013.01); *G06K 19/0723* (2013.01); *G06K 19/07722* (2013.01); *G06K 19/07786* (2013.01)

(58) Field of Classification Search
CPC .......... G06K 19/0776; G06K 19/0723; G06K 19/07722; G06K 19/07786
See application file for complete search history.

(56) References Cited

U.S. PATENT DOCUMENTS

| | | | |
|---|---|---|---|
| 2012/0080527 A1* | 4/2012 | Finn | H01P 11/001 235/492 |
| 2012/0156831 A1 | 6/2012 | Sakurai et al. | |
| 2019/0057289 A1 | 2/2019 | Bauer et al. | |
| 2019/0384261 A1* | 12/2019 | Nam | G06K 19/07722 |

FOREIGN PATENT DOCUMENTS

| | | |
|---|---|---|
| JP | H11-073109 A | 3/1999 |
| JP | 2001-134731 A | 5/2001 |
| JP | 2008-207431 A | 9/2008 |
| JP | 2008-234245 A | 10/2008 |
| JP | 2011-031433 A | 2/2011 |
| JP | 2015-046105 A | 3/2015 |
| WO | WO-2020/251394 A1 | 12/2020 |

\* cited by examiner

*Primary Examiner* — Jamara A Franklin
(74) *Attorney, Agent, or Firm* — Foley & Lardner LLP (57) ABSTRACT

An RFID inlay, a hot melt-based adhesive layer laminated on a surface of the RFID inlay on which an RFID antenna and an IC chip are formed, a first thermoplastic resin sheet, and an adherend adhesive layer configured to be attached to an adherend are laminated in this order.

8 Claims, 6 Drawing Sheets

FIG. 6

RFID LABEL AND ADHEREND

TECHNICAL FIELD

The present invention relates to an RFID label and an adherend to which the RFID label is attached.

BACKGROUND ART

JP H11-73109 A proposes a label that can be adhered to a cylindrical object such as a blood collection tube or a test tube, that is, to an attachment surface which is not a flat surface.

SUMMARY OF INVENTION

In recent years, in fields of manufacture, management, distribution, and the like of products, RFID media such as so-called RFID tags and RFID labels, which correspond to a radio frequency identification (RFID) technology for transmitting and receiving information by non-contact communication to and from an IC chip in which information related to products and identification information are written, have been widespread.

The RFID labels are also used in medical and testing fields to identify test tubes, blood bags, and the like.

The test tubes and the blood bags may be put into a centrifuge. The RFID label incorporates an RFID antenna made of a conductive material and an IC chip connected to the RFID antenna.

Since the RFID antenna and the IC chip have different specific gravities, different stresses, particularly sliding shear stresses along a plane direction, are applied to the RFID antenna and the IC chip when subjected to centrifugation. Due to the sliding shear stress, the RFID antenna and the IC chip may be peeled off, and particularly, a connection failure may occur in a connecting portion between the IC chip and the RFID antenna.

Therefore, an object of the present invention is to prevent a connection failure caused by centrifugation in an RFID label attached to an adherend to be subjected to centrifugation.

According to an aspect of the present invention, there is provided an RFID label including: an RFID inlay including an inlay substrate, an RFID antenna formed on the inlay substrate, and an IC chip connected to the RFID antenna; a hot melt-based adhesive layer laminated on a surface of the RFID inlay on which the RFID antenna and the IC chip are formed; a first thermoplastic resin sheet; and an adherend adhesive layer configured to be attached to an adherend, in which the RFID inlay, the hot melt-based adhesive layer, the first thermoplastic resin sheet, and the adherend adhesive layer are laminated in this order.

According to the aspect of the present invention, when the RFID label is attached to an adherend to be subjected to centrifugation, the thermoplastic resin sheet and the hot melt-based adhesive layer laminated on an adherend side of the RFID inlay can prevent the RFID antenna and the IC chip from being peeled off from each other, and can prevent a connection failure between the RFID antenna and the IC chip.

DESCRIPTION OF EMBODIMENTS

First Embodiment

An RFID label 1 according to a first embodiment of the present invention will be described.

Figure 1:
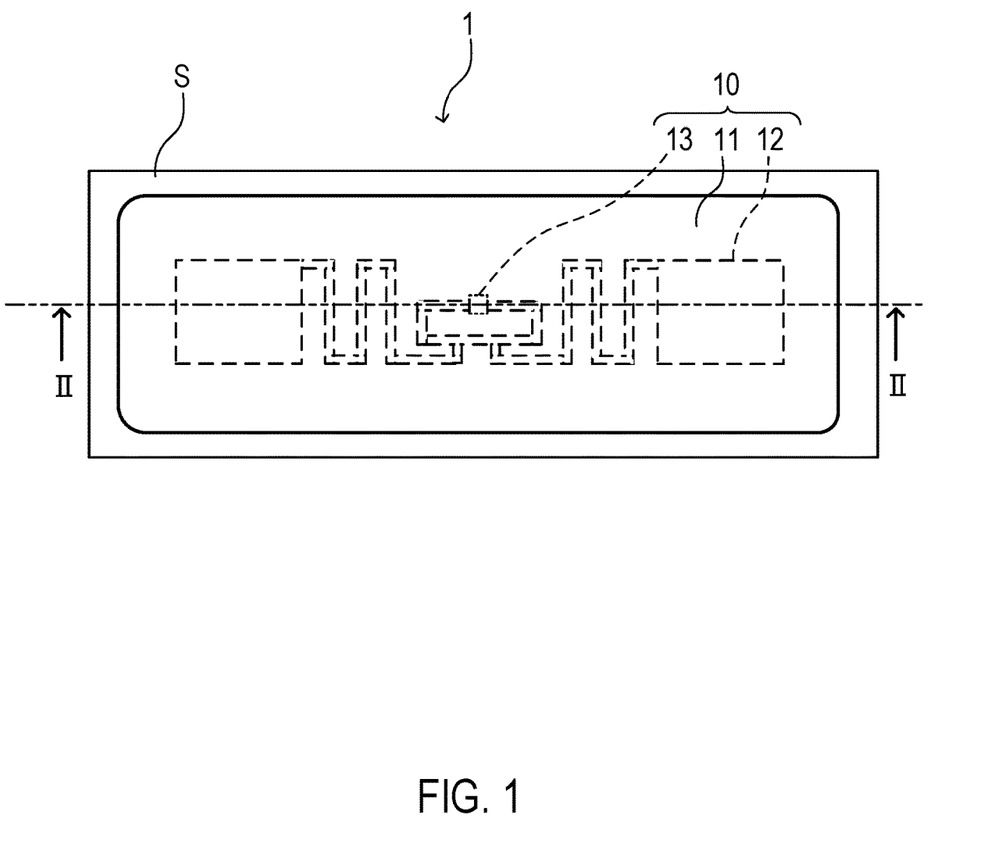
FIG. 1 is a plan view illustrating a state in which an RFID label according to a first embodiment is temporarily attached to a separator.
Figure 2:
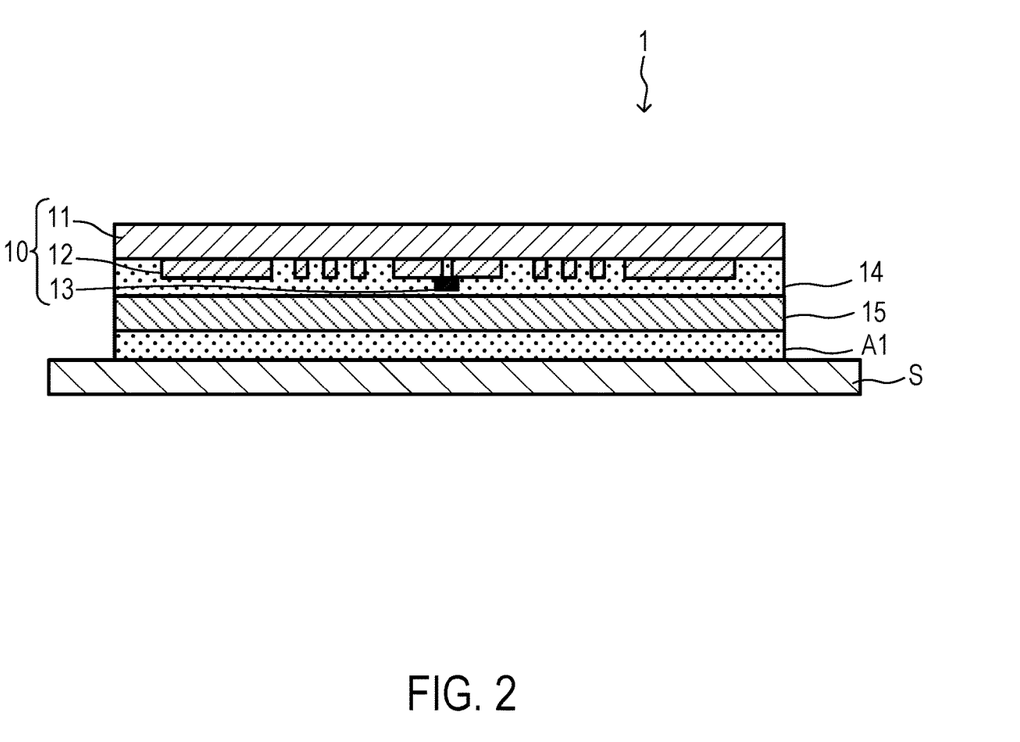
FIG. 2 is a cross-sectional view of the RFID label taken along a line II-II in FIG. 1.

FIG. 1 is a plan view illustrating a state in which the RFID label 1 according to the present embodiment is temporarily attached to a separator S. FIG. 2 is a cross-sectional view of the RFID label 1 taken along a line II-II.

As illustrated in FIGS. 1 and 2, the RFID label 1 includes an RFID inlay 10, a hot melt-based adhesive layer 14, a thermoplastic resin sheet 15, and an adherend adhesive layer A1. The separator S is temporarily attached to the adherend adhesive layer A1. In the present embodiment, the thermoplastic resin sheet 15 corresponds to a first thermoplastic resin sheet.

The RFID inlay 10 includes an inlay substrate 11, an RFID antenna 12 formed on one surface of the inlay substrate 11, and an IC chip 13 connected to the RFID antenna 12.

The thermoplastic resin sheet 15 is laminated, via the hot melt-based adhesive layer 14, on a surface of the RFID inlay 10 on which the RFID antenna 12 and the IC chip are formed.

The adherend adhesive layer A1 configured to be attached to an adherend is laminated on a surface of the thermoplastic resin sheet 15 opposite to a surface laminated on the hot melt-based adhesive layer 14.

That is, the RFID label 1 is configured to be attached such that the surface of the RFID inlay 10 on which the RFID antenna 12 and the IC chip 13 are formed is an adherend side. Accordingly, a surface of the inlay substrate 11 opposite to the surface on which the RFID antenna 12 and the IC chip 13 are formed forms a surface of the RFID label 1.

As the inlay substrate 11, for example, a single resin film such as polyvinyl chloride, a polyethylene terephthalate, a polypropylene, a polyethylene, or a polyethylene naphthalate, or a multilayer film obtained by laminating a plurality of these resin films may be used.

As the inlay substrate 11, in addition to the above resin film substrate, a paper substrate such as high-quality paper, coated paper, or coated paper formed using these paper may be used.

In the present embodiment, the inlay substrate 11 may have a thickness of 10 μm to 200 μm.

In the present embodiment, it is preferable that the inlay substrate 11 itself can be stretched in order to reduce a peeling force between the RFID antenna 12 and the IC chip 13 when subjected to centrifugation. From this viewpoint, among the above materials, it is preferable to use a single resin film or a multilayer film formed by laminating a plurality of resin films.

In the present embodiment, the RFID antenna 12 is, for example, a UHF band RFID antenna designed to have an antenna length and an antenna line width corresponding to a UHF band (300 MHz to 3 GHz, particularly 860 MHz to 960 MHz).

Although not shown, the RFID antenna 12 is adhered to the inlay substrate 11 with, for example, an acrylic-based, urethane-based, silicone-based, or rubber-based adhesive or bonding agent.

In the present embodiment, the RFID antenna 12 is made of a metal foil. A metal applicable to the RFID antenna 12 is preferably, for example, copper or aluminum. In the present embodiment, an aluminum foil is used from a viewpoint of reducing a manufacturing cost.

A thickness of the metal foil is preferably 3 µm or more and 50 µm or less from viewpoints of communication characteristics of the RFID inlay, ease of antenna processing, the manufacturing cost, and the like. In the present embodiment, for example, an aluminum foil having a thickness of 20 µm is used.

The IC chip 13 corresponds to the UHF band, and is a semiconductor package designed to be able to communicate with a reader (not shown) that is a reading device of the IC chip 13.

The IC chip 13 is electrically and mechanically connected to a part of the RFID antenna 12 with an anisotropic conductive material such as an anisotropic conductive adhesive agent or an anisotropic conductive film.

Next, the hot melt-based adhesive layer 14 will be described.

The hot melt-based adhesive layer 14 is melted by being heated at a predetermined temperature, and is an adhesive that can bond the inlay substrate 11 and the thermoplastic resin sheet 15 in a normal operating temperature range.

The hot melt-based adhesive layer 14 is an adhesive that can keep a softened state under a temperature condition when the centrifugation is performed.

In the present embodiment, examples of the applicable hot melt-based adhesive layer 14 include an ethylene vinyl acetate-based hot melt, an olefin-based hot melt, a rubber-based hot melt, and a polyurethane-based hot melt.

A temperature at which the hot melt-based adhesive layer 14 is applied varies depending on a resin constituting an adhesive. In the present embodiment, a temperature range that does not affect the inlay substrate 11, the RFID antenna 12, and the IC chip 13 is required, and it is preferable to use a hot melt-based adhesive that can be applied at 90° C. to 180° C. (preferably 120° C. to 160° C.).

The hot melt-based adhesive layer 14 can be melted by heating, and applied using a roll coater or the like onto the surface of the inlay substrate 11 on which the RFID antenna 12 and the IC chip 13 are formed.

A thickness of the hot melt-based adhesive layer 14 may be set to 8 µm or more and 25 µm or less from a viewpoint of reducing a sliding shear stress applied to the RFID antenna 12 and the IC chip 13 formed on the inlay substrate 11 during the centrifugation. In the above range, the thickness is preferably 10 µm or more and 20 µm or less.

As the thermoplastic resin sheet 15, for example, a polyethylene, a polypropylene, a polyvinylidene chloride, or a polyethylene terephthalate can be used.

In the present embodiment, as for the thermoplastic resin, from a viewpoint of having a rigidity that can follow deformation of the inlay substrate 11 and the hot melt-based adhesive layer 14 from room temperature (25° C.) which is a temperature at which the centrifugation is performed to an internal temperature of a centrifuge during the centrifugation, a glass transition temperature of the thermoplastic resin sheet is preferably 50° C. or lower. Among these, a polypropylene sheet is preferably used.

From a viewpoint of reducing peeling of the RFID antenna 12 formed on the inlay substrate 11 and the sliding shear stress applied to the RFID antenna 12 and the IC chip 13, a thickness of the thermoplastic resin sheet 15 is preferably smaller than the thickness of the inlay substrate 11.

The RFID label 1 having the above configuration is peeled off from the separator S and adhered to an adherend by the adherend adhesive layer A1.

Second Embodiment

Next, an RFID label 2 according to a second embodiment of the present invention will be described.

Figure 3:
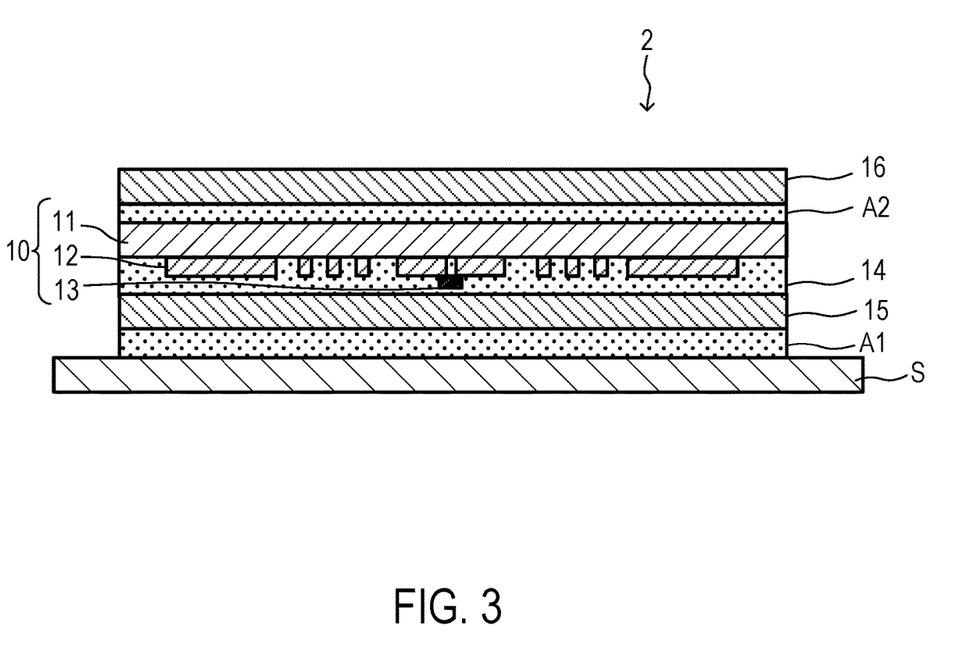
FIG. 3 is a cross-sectional view illustrating a state in which an RFID label according to a second embodiment is temporarily attached to the separator.

FIG. 3 is a cross-sectional view of the RFID label 2 according to the second embodiment.

In the RFID label 2, a thermoplastic resin sheet 16 is attached to the surface of the RFID label 1, that is, the surface of the inlay substrate 11 opposite to the surface on which the RFID antenna 12 and the IC chip 13 are formed, by a lamination adhesive layer A2. In the present embodiment, the thermoplastic resin sheet 16 corresponds to a second thermoplastic resin sheet.

The lamination adhesive layer A2 plays a role of laminating the thermoplastic resin sheet 16 on the inlay substrate 11.

As an adhesive applicable to the lamination adhesive layer A2, any adhesive that is usually used as a lamination adhesive may be applied. In the present embodiment, the same adhesive as that for the hot melt-based adhesive layer 14 described above can also be applied.

Any material applicable to the thermoplastic resin sheet 15 may be used for the thermoplastic resin sheet 16, but the thermoplastic resin sheet 16 and the thermoplastic resin sheet 15 are preferably made of the same material.

From a viewpoint of reducing peeling of the RFID antenna 12 formed on the inlay substrate 11 and a sliding shear stress applied to the RFID antenna 12 and the IC chip 13, a thickness of the thermoplastic resin sheet 15 is preferably smaller than a thickness of the inlay substrate 11, and the thermoplastic resin sheet 15 and the thermoplastic resin sheet 16 are preferably made of the same material and have the same thickness.

[Description of Adherend]

Next, a state in which the RFID label 1 or 2 according to the present embodiment is attached to an adherend will be described.

Figure 4:
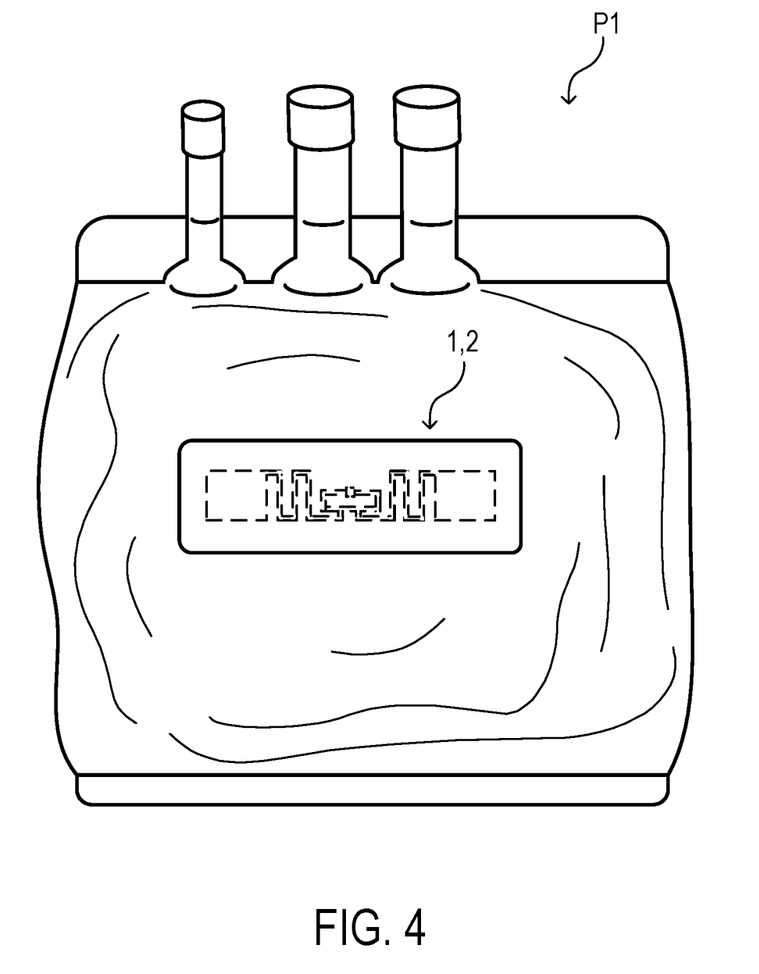
FIG. 4 is a schematic view illustrating a state in which the RFID label is attached to a blood bag.

FIG. 4 is a schematic view illustrating a state in which the RFID label 1 according to the present embodiment is attached to a blood bag P1 as an adherend to be subjected to centrifugation.

In the present embodiment, the blood bag P1 is made of soft polyvinyl chloride (soft PVC). The RFID label 1 according to the present embodiment can also be attached to an adherend, such as the blood bag P1, which is a bag body and has an unstable attachment surface because a liquid is enclosed therein.

Figure 5:
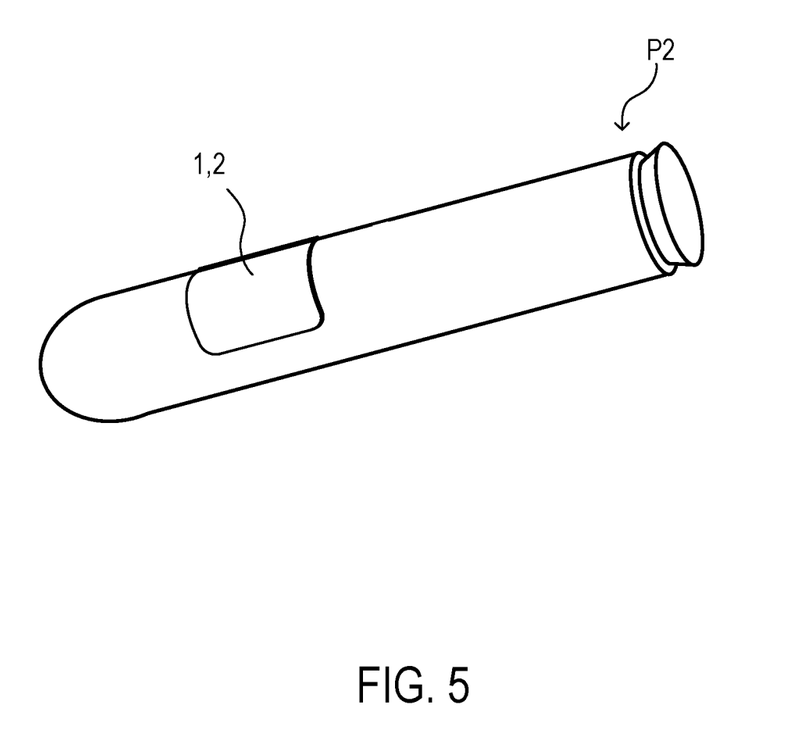
FIG. 5 is a schematic view illustrating a state in which the RFID label is attached to a test tube.

FIG. 5 is a schematic view illustrating a state in which the RFID label 1 or 2 according to the present embodiment is attached to a test tube. The adherend to which the RFID label 1 or 2 according to the present embodiment is applied is not limited to the blood bag P1.

For example, the RFID label 1 or 2 can also be applied to an adherend such as a test tube P2 having a curved attachment surface. As described above, even when the RFID label 1 or 2 is attached to the test tube P2, a sliding shear stress applied to a connecting portion between the RFID antenna 12 and the IC chip when subjected to centrifugation can be reduced, and a connection failure can be prevented.

EFFECTS

Effects of First Embodiment

In the RFID label 1 according to the first embodiment, the RFID inlay 10, the hot melt-based adhesive layer 14 laminated on the surface of the RFID inlay 10 on which the RFID antenna 12 and the IC chip 13 are formed, the thermoplastic resin sheet 15, and the adherend adhesive layer A1 configured to be attached to an adherend are laminated in this order.

In the RFID label 1, the RFID antenna 12 and the IC chip 13 have different specific gravities. Therefore, different sliding shear stresses are applied to the RFID antenna 12 and the IC chip 13 when subjected to the centrifugation. The sliding shear stress acts as a force for peeling off the RFID antenna and the IC chip.

On the other hand, in the RFID label 1, on the surface of the RFID inlay 10 on which the RFID antenna 12 and the IC chip 13 are formed, the hot melt-based adhesive layer 14 that can maintain the softened state under the temperature condition when the centrifugation is performed is laminated, and the thermoplastic resin sheet 15 is further laminated. Therefore, the hot melt-based adhesive layer 14 and the thermoplastic resin sheet 15 are easily deformed during the centrifugation.

Accordingly, when the RFID label 1 is attached to the blood bag P1 and subjected to the centrifugation, propagation of a sliding shear stress caused by deformation of an attachment surface to the inlay substrate 11 and the hot melt-based adhesive layer 14 is reduced. Due to a cushioning property of the hot melt-based adhesive layer 14, movement of the RFID antenna 12 and the IC chip 13 in a direction of the attachment surface is prevented. By the thermoplastic resin sheet 15 and the adherend adhesive layer A1, a movement of the RFID antenna 12 and the IC chip 13 in a direction intersecting the attachment surface is prevented. Accordingly, breakage of the connection portion between the RFID antenna 12 and the IC chip 13 can be prevented.

Effects of Second Embodiment

According to the RFID label 2 of the second embodiment, a sandwich structure is further formed in which the thermoplastic resin sheet 16 is formed outside the surface of the RFID label 1 of the first embodiment via the lamination adhesive layer A2.

Accordingly, in addition to the above effect of preventing, by the hot melt-based adhesive layer 14 and the thermoplastic resin sheet 15, the sliding shear stress to the RFID antenna 12 and the IC chip 13, a resistance to distortion due to bending deformation of the blood bag P1 is also enhanced.

That is, for example, a material having a high rigidity such as PET is used as the inlay substrate 11. On the other hand, the RFID label 2 has a sandwich structure as described above.

In the RFID label 2, the thermoplastic resin sheet 15 having a rigidity lower than that of the inlay substrate 11 is laminated on an inner side where a bending deformation amount is large. Similarly, the thermoplastic resin sheet 16 having a rigidity lower than that of the inlay substrate 11 is laminated on an outer side where a bending deformation amount is large.

Therefore, when the RFID label 2 deforms following the deformation of the blood bag P1, the inlay substrate 11 is located at a position close to a bending center where a deformation amount is small. Accordingly, the RFID label 2 can prevent distortion from occurring in the inlay substrate 11 in response to surface deformation of the blood bag P1.

Accordingly, in addition to the effect of reducing the sliding shear stress by the hot melt-based adhesive layer 14 and the thermoplastic resin sheet 15, an effect of preventing a connection failure of the connection portion between the RFID antenna 12 and the IC chip 13 formed on the inlay substrate 11 is enhanced.

Other Embodiments

Although the embodiments of the present invention have been described above, the above embodiments are merely a part of application examples of the present invention, and are not intended to limit the technical scope of the present invention to the specific configuration of the above embodiments.

The RFID label 1 and the RFID label 2 may be provided as an RFID label continuous body which is temporarily attached to the long belt-shaped separator S continuously at predetermined intervals.

In the present embodiment, the RFID antenna 12 may be formed by printing using conductive ink.

Figure 6:
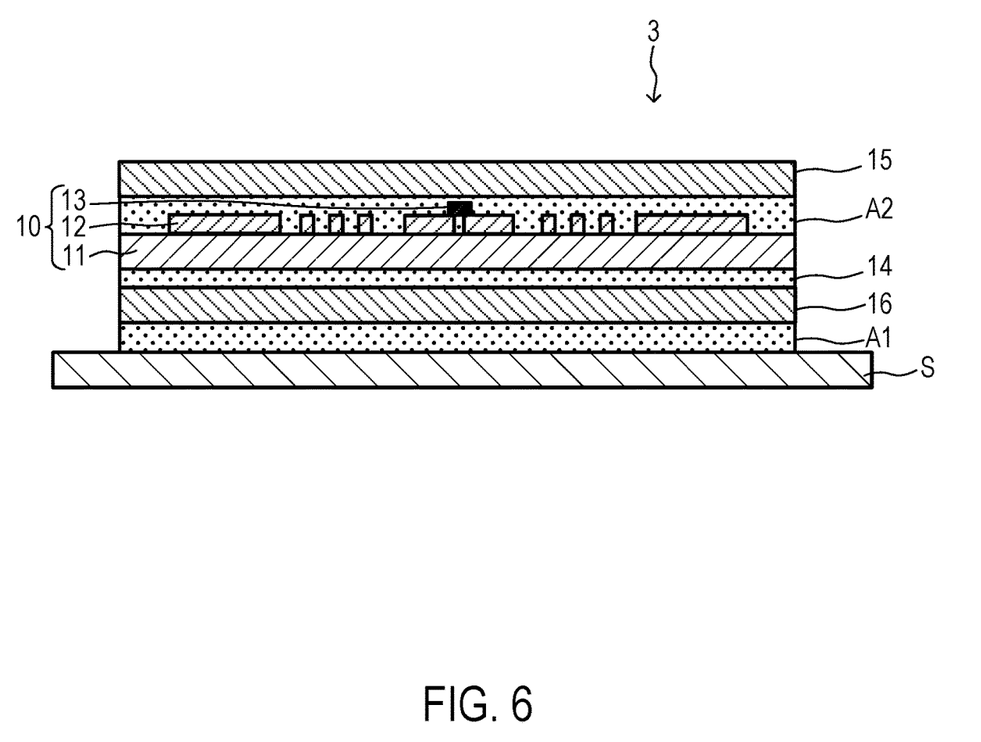
FIG. 6 is a cross-sectional view illustrating a modification of the RFID label.

In the present embodiment, the inlay substrate 11 may be formed such that the surface on which the RFID antenna 12 and the IC chip 13 are formed faces a side (a surface side) opposite to the adherend. FIG. 6 is a cross-sectional view of an RFID label 3 shown as a modification.

The RFID label 3 shown in FIG. 6 is laminated such that the surface of the RFID label 1, that is, the surface of the inlay substrate 11 on which the RFID antenna 12 and the IC chip 13 are formed faces a side (a surface side) opposite to an adherend.

In the RFID label 3, the inlay substrate 11, the hot melt-based adhesive layer 14, the thermoplastic resin sheet 16, and the adherend adhesive layer A1 are laminated in this order, and the thermoplastic resin sheet 15 is laminated, via the lamination adhesive layer A2, on the surface on which the RFID antenna 12 and the IC chip 13 are formed.

In the RFID label 3, the lamination adhesive layer A2 may be laminated on the surface of the inlay substrate 11 on which the RFID antenna 12 and the IC chip 13 are formed, and the hot melt-based adhesive layer 14 may be laminated on the surface opposite to the surface on which the RFID antenna 12 and the IC chip 13 are formed.

In the present embodiment, a case where the RFID antenna 12 is a UHF band inlet RFID antenna has been described, but the RFID antenna 12 may be a microwave band RFID antenna.

In the present embodiment, shapes and sizes of the RFID label 1 and the RFID label 2 can be changed as appropriate. For example, an external size of the RFID label 1 may be larger than that shown in FIG. 4, and may be a size that covers a surface of the blood bag P1 over a wide range.

In the present embodiment, the adherend is not limited to the blood bag P1 and the test tube P2. A bag body, a box body, or the like other than the above may be used.

The present application claims priority under Japanese Patent Application No. 2020-215297 filed to the Japan Patent Office on Dec. 24, 2020, and the entire content of this application is incorporated herein by reference.

The invention claimed is:

1. An RFID label, comprising:
   an RFID inlay including an inlay substrate, an RFID antenna formed on the inlay substrate, and an IC chip connected to the RFID antenna;
   a hot melt-based adhesive layer laminated on a surface of the RFID inlay on which the RFID antenna and the IC chip are formed;
   a first thermoplastic resin sheet; and
   an adherend adhesive layer configured to be attached to an adherend, wherein
   the RFID inlay, the hot melt-based adhesive layer, the first thermoplastic resin sheet, and the adherend adhesive layer are laminated in this order.

2. The RFID label according to claim 1, wherein
   a second thermoplastic resin sheet is laminated, via a lamination adhesive layer, on a surface of the RFID inlay opposite to the surface on which the hot melt-based adhesive layer is laminated.

3. The RFID label according to claim 2, wherein
   the first thermoplastic resin sheet and the second thermoplastic resin sheet are made of a same material.

4. The RFID label according to claim 2, wherein
   the first thermoplastic resin sheet and the second thermoplastic resin sheet are formed with a same thickness.

5. The RFID label according to claim 2, wherein
   the inlay substrate is made of a polyethylene terephthalate, and
   the first thermoplastic resin sheet and the second thermoplastic resin sheet are made of a polypropylene.

6. The RFID label according to claim 2, wherein
   glass transition temperatures of the first thermoplastic resin sheet and the second thermoplastic resin sheet are 50° C. or lower.

7. The RFID label according to claim 1, wherein
   a rigidity of the first thermoplastic resin sheet is lower than a rigidity of the inlay substrate.

8. The RFID label according to claim 2, wherein
   a rigidity of the second thermoplastic resin sheet is lower than a rigidity of the inlay substrate.

* * * * *